UNITED STATES PATENT OFFICE.

CHARLES A. FRENCH, OF CHICAGO, ILLINOIS, ASSIGNOR TO INTERNATIONAL HARVESTER COMPANY, A CORPORATION OF NEW JERSEY.

REFRACTORY MATERIAL AND PROCESS OF MAKING THE SAME.

1,418,372. Specification of Letters Patent. Patented June 6, 1922.

No Drawing. Application filed June 14, 1920. Serial No. 388,969.

*To all whom it may concern:*

Be it known that I, CHARLES A. FRENCH, a citizen of the United States, residing at Chicago, in the county of Cook and State of Illinois, have invented certain new and useful Improvements in Refractory Materials and Processes of Making the Same, of which the following is a full, clear, and exact specification.

My invention relates to a refractory material and method of making it and has for an object to provide a composition that can be moulded into any desired shape and is resistant to shocks and abrasion at high temperatures.

Another object is to provide a refractory material that is also a good insulator thereby adapting it to use in spark-plug and other insulators, as well as in crucibles and furnace linings.

Another object is to provide a refractory material wherein the material itself serves as a binder in the finished product.

My refractory material consists essentially of a compound formed from zirconium oxide and steatite and in its best proportions comprises about 80% of the former and 20% of the latter ingredient, but the proportions may be varied to suit the conditions under which the material is to be used.

Zirconium oxide, or zirconia, as it is commonly known, is one of the highest refractory substances in commercial use, but in its pure state cannot be used because of the difficulty in forming it into bricks or other desired shapes, the zirconia itself having no binding or adhesive properties below its fusing point. It has heretofore been necessary to combine with the zirconia a substance, such as alumina, to act as a binder, but this is objectionable because the alumina remains in the finished product after burning and renders the material unsuited for many purposes as well as greatly reducing both the strength and point of fusing of the zirconia. I have discovered a process of making a zirconia refractory material in which the binding agent entirely disappears when the compound is fired, as will now be described.

I have discovered by adding a limited amount of steatite to zirconia and then heating the mixture that a new compound is formed that makes an excellent refractory material for many purposes if the steatite is not less than 15% nor greater than 40%. When the steatite is much less than 15% the compound lacks strength and uniformity while if in excess of 40% its fusing point will be too low. I have found that the best results are produced when the compound is formed from 80% zirconia and 20% steatite, the resulting material having great physical strength over a wide range of temperatures and having a fusing point but little lower than zirconia, thereby filling all the requirements of a high refractory material.

In making my refractory material, the zirconia and steatite are separately finely ground and then thoroughly mixed in definite proportions by weight. Water is then added in sufficient quantity to enable the mixture to be pressed into bricks, which are thoroughly air dried. After drying, the bricks are fired in an electric or other suitable furnace until they are fused. The fused compound is then cooled, preferably in water, and thereafter ground to such a degree of fineness that the particles will pass through a 30-mesh or finer screen. The object in fusing the mixture is to produce a uniform compound that will not shrink after being moulded into final form, the zirconia and soapstone shrinking to a considerable extent when first heated.

The finely ground compound is then mixed with a small percentage of volatile binder, preferably 1½% of gum arabic and a very small quantity of water, and pressed under high pressure into final shape as bricks, crucibles, insulators, and the like. They are then fired at a temperature that will completely volatilize and drive off the binder and soften but not fuse the compound. The resulting articles after cooling are hard, dense and smooth and of their original shape and size, there having been no warping or shrinking during the firing.

Among the many advantages of my new refractory material are its high melting point, its great strength at all temperatures up to its softening point, its ability to withstand the cutting action of molten metal, the capability of making a refractory material of varying strength and heat resistance by varying the proportions of the ingredients to meet any requirements, and many others that will be apparent to those skilled in the art.

While I have described a refractory compound formed from zirconium oxide and steatite and a method of making it, it is to be understood that I am not to be limited to the exact product and process described but claim as my invention all modifications and variations of the product and process that fall within the scope of my invention and the appended claims.

1. A refractory compound formed essentially from zirconium oxide and steatite.

2. A refractory material formed by heating a mixture of zirconium oxide and steatite.

3. A refractory material formed from a mixture of zirconium oxide 85 to 60% and steatite 15 to 40%.

4. A refractory material formed from a mixture of zirconium oxide 80% and steatite 20%.

5. A refractory compound formed by fusing a mixture of zirconium oxide and steatite.

6. The method of making refractory material which consists in mixing zirconium oxide and steatite in definite proportions by weight, fusing the mixture, grinding the fused compound, mixing the ground compound with a binder, pressing into the desired form, and heating the formed product.

7. The method of making refractory material from zirconia and steatite consisting in mixing the ingredients in a finely divided state, fusing the mixture to shrink it and form a uniform compound, finely dividing the compound, mixing with a volatile binder, pressing into final form under high pressure, and firing the formed material to drive off the binder and cause a union of the finely divided particles of the compound.

8. The method of making refractory material from zirconium oxide and steatite which consists in mixing the ingredients, moistening the mixture, pressing into bricks, fusing the bricks to shrink the mixture and form a uniform compound, grinding the fused compound, mixing with a volatile binder, pressing into the desired form, and heating to drive off the binder and soften but not fuse the compound.

9. The method of pre-shrinking a refractory material composed essentially of zirconia and steatite which consists in intimately mixing the ingredients in a dry finely divided state, moistening the mixture, pressing into bricks, and fusing the bricks.

10. The method of making refractory articles which consists in pre-shrinking a mixture containing zirconia and steatite finely grinding the resultant compound, mixing with a volatile binder, moulding the article under high pressure, and heating to drive off the binder and unite the refractory particles.

11. The method of making a refractory material composed essentially of zirconium oxide and steatite which consists in mixing the ingredients in a finely divided state, fusing the mixture, quenching the fused compound, finely dividing the quenched material, mixing with a volatile binder, forming into shape under pressure, and heating to volatilize the binder and causing the particles to cohere.

12. The method of making a refractory material composed essentially of zirconium oxide and steatite which consists in mixing the ingredients in a finely divided state, fusing the mixture, quenching the fused compound, finely dividing the quenched material, mixing with a small percentage of gum arabic, forming into shape under pressure, and heating to volatilize the binder and causing the particles to cohere.

In testimony whereof I affix my signature.

CHARLES A. FRENCH.